United States Patent [19]

Heller, Jr. et al.

[11] 4,067,765
[45] Jan. 10, 1978

[54] SUSCEPTOR BASED BONDING TECHNIQUE FOR PLASTIC MATERIAL UTILIZING OLEAGINOUS SUBSTANCE AT THE BONDING INTERFACE

[75] Inventors: William C. Heller, Jr., Milwaukee, Wis.; Alfred F. Leatherman, Columbus, Ohio

[73] Assignee: William C. Heller, Jr., Milwaukee, Wis.

[21] Appl. No.: 724,101

[22] Filed: Sept. 17, 1976

[51] Int. Cl.² .................... B29C 19/02; B32B 19/02
[52] U.S. Cl. ................................ 156/272; 156/380
[58] Field of Search ........................ 156/272, 380; 219/10.41, 10.43, 10.53, 10.81; 252/510, 511, 513

[56] References Cited

U.S. PATENT DOCUMENTS

| 2,087,480 | 7/1937 | Pitman | 156/272 |
| 3,158,520 | 11/1964 | Edmonds et al. | 156/307 |
| 3,189,702 | 6/1965 | Wall et al. | 156/272 |
| 3,840,254 | 10/1974 | Shatzkin | 156/272 |

Primary Examiner—Douglas J. Drummond
Attorney, Agent, or Firm—Andrus, Sceales, Starke & Sawall

[57] ABSTRACT

A film of an oleaginous substance is interposed between the surfaces of plastic elements to be joined by a thermal bond. The heat necessary for bonding is obtained by the incorporation of heat generating particles in the bond region, either in the plastic element or in the film. The particles are indirectly heatable by a high frequency alternating magnetic field or other suitable field. This provides a rapid and efficient heating of the surfaces to the bonding temperature, with the oleaginous substance enhancing the bonding action and the properties of the bond.

21 Claims, 8 Drawing Figures

SUSCEPTOR BASED BONDING TECHNIQUE FOR PLASTIC MATERIAL UTILIZING OLEAGINOUS SUBSTANCE AT THE BONDING INTERFACE

BACKGROUND OF THE INVENTION

1. Field of the Invention

The present invention is directed to methods for joining plastic materials utilizing energy field activated heat source particles incorporated in the plastic or in the oily substance interposed along bonding surfaces.

BACKGROUND OF THE INVENTION

2. Description of the Prior Art

The thermoplastic properties of many commonly available thermoplastic materials permit the joinder of such materials by thermal bonding or welding. In such techniques, the surfaces to be joined are heated to heat sealing temperatures. Before, during or after the elevation of the surfaces to such temperatures, the surfaces to be joined are brought into contact, usually under the influence of pressure. Thereafter, the thermal bond is allowed to cool. The result is an intimate bond between the two surfaces having strength and other mechanical and chemical properties similar to those of the parent thermoplastic materials.

It has heretofore been generally assumed that to provide high quality bonds, it was necessary to have the surfaces to be joined relatively clean so as to avoid the incorporation of undersirable, weakening substances in the bond during fusion and to insure good contact between the surfaces to be joined. As more fully disclosed in the copending application of the present inventors entitled THERMAL BONDING METHOD FOR PLASTIC SURFACES UTILIZING AN INTERPOSED SEPARATE OLEAGINOUS FILM AT THE BONDING INTERFACE AND TO ARTICLES FORMED THEREBY filed on the same day as this application, the presence of an oleaginous substance between the interface bonding portions of plastic elements to be thermally bonded enchances, rather than impairs, the thermal bonding action and the properties of the thermal bond when joining plastic elements. The film of an oleaginous substance is interposed between the joinder portions and the joinder area is then heated by a separate heat source to the appropriate temperature, while in proper abutment and subsequently cooled to obtain thermal bond of the one portion to the other.

SUMMARY OF THE PRESENT INVENTION

The present invention is directed to a preferred method of bonding with an oily film at the interface and particularly to dispersing of activatable heat generating particles or susceptor as the heat source for raising the temperature in the joinder region to the necessary bonding temperature. The susceptor may be incorporated in the plastic materials, or in the oleaginous substance interposed between the plastic materials. Upon exposure to a high frequency energy field, the particles are activated and form heat sources which heat the oleaginous substance and the abuting surfaces of the materials to thermal bonding temperature. The particles are preferably selected from materials which generate heat as a result of hysteresis in the presence of an appropriate field, such as disclosed in U.S. Pat. No. 3,574,031. Such particles are extremely minute and may be dispersed throughout the bond area to provide excellent heating characteristics. Since heat generation occurs at or in close proximity to the bonding interface including the heat transferring interposed oleaginous substance, the bonding action in accordance with the present invention is facilitated and provides a practical implementation of the use of the bond improving oleaginous substance.

In various embodiments of the invention, a granulated thermoplastic may be incorporated in the oleaginous substance along with the susceptor material to further assist in the bonding action. If desire or necessary, the susceptor particles may be dispersed in the granulated thermoplastic incorporated in the oleaginous substance.

The improved bonding action and properties resulting from the oleaginous substance appears, at least in part, to be enhancement of heat transfer at the interface and surface connection, with the susceptor material providing a reliable and rapid method of effecting the heating of the surfaces including the conductive heat transfer directly from the heat sources and through the oleaginous substance.

BRIEF DESCRIPTION OF THE DRAWING

The drawing furnished herewith illustrates a preferred construction of the present invention in which the above advantages and features are clearly disclosed as well as others which will be readily understood from the following description.

In the drawing.

DESCRIPTION OF THE PREFERRED EMBODIMENT

Figure 1:
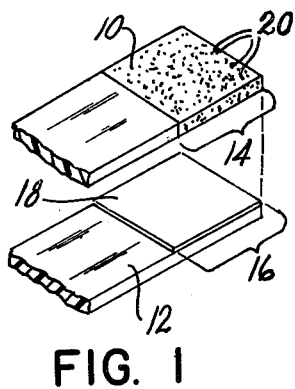
FIG. 1 is a partial schematic view showing an initial step in the process of the present invention for obtaining thermal bonding of a pair of thermoplastic units employing particles within the bond region as heat sources.
Figure 2:
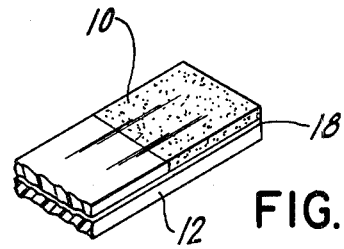
FIG. 2 shows a subsequent step in the bonding process of FIG. 1.

Referring to FIG. 1, the process of the present invention is shown in bonding a first thermoplastic layer or unit 10 to a second thermoplastic layer or unit 12 by a thermal bond at overlapping joinder interface portions 14 and 16. Layers 10 and 12 may typically be formed of high density polyethylene.

A film of an oleaginous material or substance 18 is interposed between overlapping portions 14 and 16, as by applying the film to overlapping portion 16 of layer 12, similarly to that identified in applicants' copending application.

The term "oleaginous" substance is employed to define a class of materials possessing the properties of oiliness or lubricity and which have been found to produce improved heat transfer with improvement in the bonding of thermoplastic elements. The materials further generally appear to have good wetting characteristics and, therfore, good contact to the surface of the thermoplastic elements. For a description of particular oleaginous materials reference may be made to the above application.

In the present invention, susceptor particles 20 are incorporated in the bond region which is responsive to a suitable energy field to form individual heat sources for rapidly heating of the surfaces to a bonding temperature. In the embodiment of the invention shown in FIG. 1, susceptor particles 20 are dispersed directly into at least one of layers 10 and 12; for example, portion 14 of layer 10 for illustrative purposes. The particulate susceptor particles are incorporated in either or both of layers 10 and 12 in quantities sufficient to produce the necessary heating upon the application of an appropriate energy field. The particles may be incorporated into layers 10 and 12 in any suitable manner such as by the selective insertion during extrusion of such layers, heating of plastic elements to soften the interface and then pressing the particles into the plastic of the like.

The heat generating particles 20 are selected to form individual heat sources in the presence of suitable energy field. For example, different particles may be activated by suitable high frequency, alternating magnetic and electrical fields. The separate susceptor particles may, of course, be responsive to other fields such as a radiant field, including infrared radiation in which case the susceptor particles may comprise carbon black.

The susceptor particles 20 preferably consists of fine particles of a ferromagnetic, non-conductive, metallic oxide selected from gamma $Fe_2O_3$, $Fe_3O_4$ and mixtures thereof which are responsive to the application of a high frequency alternating magnetic field as more fully disclosed in the previously identified patents. Gamma $Fe_2O_3$ has been found particularly suitable for use in the method of the present invention. The particles 20 may be incorporated in quantities of less than 2% to more than 50% by weight with respect to the thermoplastic material, quantities of 10 to 30% being typical. The unique ability of the aforesaid materials resides in their ability to retain their heat generating characteristics even when reduced to submicron sizes. Particles sizes as small as 0.01 microns may be used, although typically in a range up to 20 microns and in some cases may even be larger. The use of the more minute particles facilitates incorporation into the enhancement film with the advantages of the susceptor heating while retaining the advantages of the improved bonding of the plastic members. The dispersion of the susceptor in the thermoplastic material as a result of the bonding does not appreciably alter the chemical or physical properties of the thermoplastic material.

Figure 3:
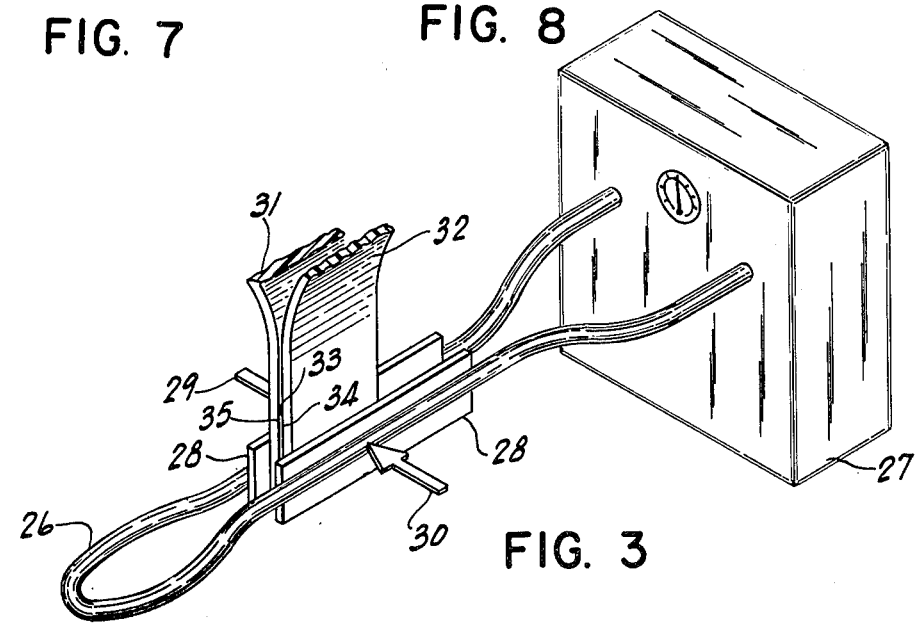
FIG. 3 shows an induction heating unit suitable for the bonding process of the present invention.

Layers 10 and 12 with the enhancement mineral oil film 18 between them are exposed to the appropriate energy field. In the present embodiment, the particulate susceptor particles 20 in layer 10 are activated by an alternating magnetic field which may be established by a coil 26 such as shown in FIG. 3. The coil 26 is energized by the current of high frequency alternating current power source 27. High frequency power source 27 may typically operate in a frequency range of 0.4 to 5000 megahertz with a frequency range of 2 to 30 megahertz being typical for the conventional hairpin coil schematically shown in FIG. 3. A pair of opposed flat pieces of copper plates 28 are soldered or otherwise firmly affixed to the inner faces or side of the coil. The plates 28 in one unit were approximately one quarter inch wide and several inches long. Force is applied across the tubing at the copper plates 28 in any suitable manner, as diagrammatically shown by the force arrows 29 and 30, to permit collapsing of the coil and plates 28 toward each other for applying pressure across elements located therebetween. By releasing of the clamping force 29 - 30, the assembled or stacked elements can be moved through the coil 26 to make successive seals or joiners.

The activated particulate susceptor particles 20 of layer 10 increase in temperature and define dispersed heat sources along the bonding interface and rapidy raise the surface of layers 10 and 12 to the heat bonding temperature by conduction, with the film 18 enhancing the heat transfer and bonding action. Thus, application of a magnetic field may cause the operative heating of the layers to the bonding temperature. Although a time on the order of a fraction of a second may be adequate with appropriate particle loading, power levels and the like, longer heating times work equally well and may be achieved with less input power to coil 22, as shown in the subsequent typical examples.

As soon as the bonding interfaces of layers 10 and 12 have reached the heat bonding temperature, the application of the alternating magnetic field may be removed as by deenergizing high frequency power source 27. When the thermal bond is completed, layers 10 and 12 are removed from coil 22.

Figure 4:
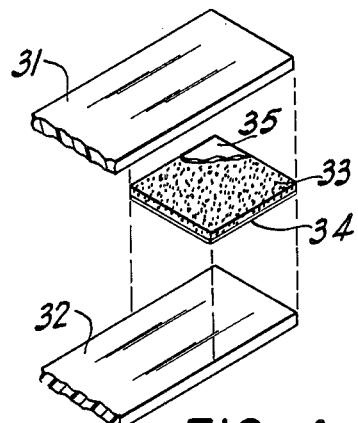
FIG. 4 shows another embodiment of the process of the present invention in which a separate bonding stratum is utilized to effect the bond between a pair of plastic units.

FIG. 4 shows another embodiment of the present invention for bonding of plastic elements 31 and 32 in which a separate bonding stratum 33 is used between such layers. Stratum 33 may be comprised of a thermoplastic carrier containing heat generating particles 20. The thermoplastic carrier of stratum 33 may be formed of the same material as layers 31 and 32, or any other material which bonds to layers 31 and 32 as the result of heating thereof to a bonding temperature. Bonding stratum 33 is inserted between the overlapping portions 14 and 16 of layers 31 and 32 with an oily film applied to both bonding interfaces or surfaces on the opposite faces of bonding stratum 33, as at 34 and 35. The stacked layers are then placed in an induction heating coil, such as coil 26 as shown in FIG. 3, with the interfaces in abutment. Energizing of coil 26 creates an alternating magnetic field which activates the particles to generate heat. The heat generated in bonding stratum 33 raises the interfaces to the bonding temperature and the stratum 33 and both layers 31 and 32 are rapidly heated to the bonding temperature and a thermal bond formed between the two layers. Inasmuch as heat is simultaneously generated in close proximity to both bonding interfaces and to the enhancing oily film, the bonding process is quite rapid.

The following examples of the method of FIG. 4 serve to illustrate the improvement obtainable with the technique of the present invention.

EXAMPLE 1

| | |
|---|---|
| Layers 31 and 32 | ¼" thick high density polyethylene |
| Oleaginous Substance | mineral oil |
| Bonding Stratum | polyethylene 8–10 mils (.008 – .010 in) thick |

| -continued | |
|---|---|
| Bonding Conditions | containing 15% by weight particulate gamma $Fe_2O_3$ (Avg. <1 micron) Coil Current - 450 amps Applied Pressure - 50 psi Time of coil energization and pressure application - 5 sec. |
| Peel strength of Bonds | |
| Without oleaginous substance | 33 lbs per inch of width |
| With oleaginous substance | 175 lbs per inch of width |

EXAMPLE 2

Same layers 31 and 32, oleaginous substance, and bonding agent 33 as in Example 1.

| Bonding Conditions | |
|---|---|
| Coil Current | 500 amps |
| Applied Pressure | 50 psi |
| Time of Coil (energization and pressure application | 5 sec |
| Peel Strength of Bonds | |
| Without oleaginous substance | 117 lbs per in of width |
| With oleaginous substance | 205 lbs per in of width |

It is to be noted that Example 1 employed 450 amps of coil current whereas Example 2 employed 500 amps. Yet Example 1, through the use of an oleaginous substance, was able to produce a stronger bond (175 lbs/in) than was Example 2 without the oleaginous substance (117 lbs/in). It is readily apparent that a substantial saving in power consumption can be obtained with the present invention.

EXAMPLE 3

Same layers 31 and 32, oleaginous substance, and bonding agent 33 as in Examples 1 and 2.

| Bonding Conditions | |
|---|---|
| Coil Current | 500 amps |
| Applied Pressure | 15 psi |
| Time of coil energization and pressure application | 5 sec |
| Peel Strength of Bonds | |
| Without oleaginous substance | 55 lbs/in. of width |
| With oleaginous substance | 103 lbs/in. of width |

In addition to the polyethylene to polyethylene bonding described in detail above the invention has also been found to enhance the bonding of polypropylene layers with a polypropylene susceptor stratum. Mineral oil was used as the oleaginous substance. It has similarly been practiced in connection with acrylic nitrile copolymer (sold under the trade name Barex) layers with an acrylic nitrile copolymer susceptor stratum with motor oil as the oleaginous substance.

In a further example of carrying out the invention, a pair of high-density polyethylene (HDPE) elements 31 and 32, each approximately 1 inch wide by 6 inches long and approximately one-eighth inch in thickness were formed. The intermediate high-density polyethylene bonding element 33 was interposed between the two rectangular elements 31 and 32. The carrier bonding element was approximately 10 mils thick and was loaded with a gamma ferric oxide heat-generating powder such as taught in U.S. Pat. No. 3,574,031. The stacked pieces with the carrier element 33 therebetween was assembled between the clamping plate 28 with a force of typically 50 pounds across the plate to firmly clamp the pieces therebetween. The elements were located extending through the plates to define a bond area of approximately 1 inch by ¼ inch. The coil 26 was then energized to produce approximately 400 amperes of current for a suitable period; typically from 2 to 5 seconds. A bond was created across the area aligned with the pressure plates of about 1 inch by ¼ inch.

Further, in carrying out the invention, two different kinds of carrier elements 33 were made. One was formed by hot pressing of kneaded polyethylene and susceptor particles while the other was formed by extruding of the polyethylene with the susceptor particles.

The characteristic of oily film bonding was checked by forming of a number of bonds in accordance with the invention and a number of control bonds without the use of the interposed oily medium. Further, in carrying out the method; various liquids were applied with an acid brush across both sides of the carrier element to form the enhancing oily films 34 and 35 between the bonding surfaces of the carrier element 33 and the two elements 31 and 32. The wax materials were applied by first melting the waxes and then applying the liquified materials with a hot brush to form the thin films.

The oily bond samples were then processed under the same time, current and forces as the control element. The specimens were tested by opening the unbonded leg portions of the samples in a calibrated tensile device until there was a failure in the "peel" area. Although the actual bond area is not as significant as the width of the bond in the direction perpendicular to the separating force, the results provide a true measure of the bond strength. The bond strength is given in pounds per inch width.

The results of the examples are summarized in the following table where the peel bond strengths are based on failure of the bond portion between the bonded polyethylene elements, with the kneaded polyethylene carrier element as type A and the extruded polyethylene carrier element as type B in the table. Control #1, 2 and 3 of the table were similar tests bonding polyethylene without the oily film.

TABLE I

PEEL BOND STRENGTHS

Peel Bond Strengths, Pounds Per Inch Width

| Sample | Type A 5 sec, 400A | Type B 2½ sec, 400A |
|---|---|---|
| Control #1 (without oily film) | 57 | 40 |
| Control #2 (without oily film) | 57 | 100 |
| Control #3 (without oily film) | 40 | 55 |
| Paraffin film in bond | 87 | 72 |
| Beeswax film in bond | 95 | 92 |
| Vaseline film in bond | 75 | 67 |
| Linseed oil film in bond | 95 | 90 |
| Castor oil film in bond | 90 | 82 |
| Benzene film in bond | np | 57 |
| Water film in bond | np | 67 | np = not prepared

In the control #2 piece, a good bond was obtained with the type B bonding element. The operator who carried out the test believed that the surfaces may have been contaminated with linseed oil. However, such a bond might also occur with clean surfaces which were extremely flat and created excellent touching engagement. The oily bond tests uniformly show a highly unexpected and very significant increase in the bond strength, generally on the order of at least 30% and in some instances over 100%.

With benzene and water, no noticeable improvement was noted in the second or type B carrier element. It appeared that the film material in both instances were vaporized by the necessary sealing temperatures and thus effectively were removed from the bond area leaving only the control conditions of a dry clean bond surface. No tests were, therefore, attempted with the first or type A carrier element.

In addition to the material of the above Table I, bonding improvement was similarly obtained employing an oily film of the following materials: butter, margarine, lard, Crisco, (vegetable oil), hydraulic pump oil and Chevron brand ball bearing grease number BRB2.

The analysis of the several examples further confirms the theory that the oily bond material did not chemically react within the bond area but rather functioned essentially to promote the necessary surface conditions and interaction between the surfaces to effect the highly improved bond. In particular, it would appear that the oily material functions to create essentially ideal thermal conditions between the bond surfaces such that repetitive formation of high quality bonds having high strength can be made. Further, the creation of ideal conditions minimize the necessary heating time required to effect a bond between the two surfaces, The extruded film bonding element provides a somewhat more efficient heat source and the heating time was less as shown in the chart. This analysis is further supported in the bonding action found in bonding of two layers of nylon material by interposing of a nylon ribbon having susceptor particles dispersed therein. A well-known and commercially available and meltable material was employed. An oily film of castor oil was applied to both sides of the carrier and the layers bonded. In contrast where a separate conventional adhesive material was employed as a separate adhesive, the oily film interfered with adhesive action of this adhesive material. Similar results were noted in use of a separate adhesive material applied to thermosetting elements such as those formed of the well-known bakelite.

Figure 5:
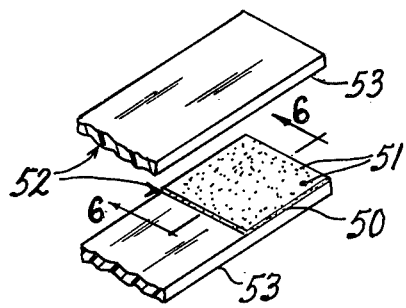
FIG. 5 shows another embodiment of the process of the present invention in which susceptor particles are incorporated in an oleaginous film at the bonding interface.
Figure 6:
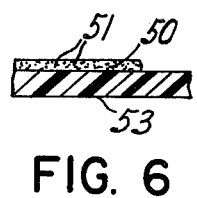
FIG. 6 is a detailed partial cross-sectional view taken along the line 6—6 of FIG. 5.

FIGS. 5 and 6 illustrate still a further embodiment wherein a film 50 of the suitable oleaginous substance which includes susceptor particles 51 dispersed throughout is interposed between overlapping interface bonding portions 52 of plastic elements 53. The film material and particles may be thoroughly mixed and then applied as the film to the one overlapping portion 52.

The rheology of the particle laden film must be considered, since the enhancement film should be sufficiently fluid to cover the bond surface yet sufficiently viscous to avoid running or dripping from the bond surface. In part, the rheology of the oleaginous substance or material impart these properties to the film. The quantity of susceptor particles added to the oleaginous substance also affects the rheology of the film since the susceptor particles generally act as a thickening agent for the oleaginous substance. Therefore, susceptor particle addition to the oleaginous substance should be in an amount to maintain the desired viscosity for proper application and use as well as producing the necessary heat input.

In the formulation of a particle bearing film, a combination of 50% mineral oil and 50% gamma $Fe_2O_3$ by weight has been found to have a sufficient viscosity to remain in place while permitting convenient application and the necessary heat to raise the plastics to the bonding temperature.

The susceptor particles may be incorporated in substantially smaller or greater quantities depending on the other operative factors and the fluid characteristic or viscosity of the oily material.

The thickness of film 50 interposed between the layers to be bonded may initially be approximately 1 to several microns. However, films which are initially thicker may be used since subsequent pressure applied during bonding acts to expel excess bonding agent.

After application of mineral oil or other suitably oleaginous material containing susceptor particles 51, layers 53 may be brought together. The layers with the particle laden film 50 between them are then exposed to the energy field, as by location of the overlapping portions 52 of the layers 53 within a coil 26.

The alternating magnetic field of coil 26 again generates heat in the particulate susceptor particles 51 in the film 50 and elevates the temperatures of layers 53 at the interface region to the thermal bonding temperatures. When the bonding interfaces of layers 53 have reached the bonding temperature, the application of the pressure and the alternating magnetic field may be removed. A film mixture of essentially equal amounts, by weight, of gamma $Fe_2O_3$ particles and mineral oil was employed to bond together two high density polyethylene strips. The strips were ⅛ inch thick and ⅞ inch wide. The film remained in place during assembly and bonding and an improved bond was created.

The formation of the thermal bond may be assisted in any of the described embodiments by a circulating coolant, such as shown in FIG. 3 wherein a coolant supply forming a part of power supply unit 27 and is connected to coil 26 which is formed of a tubular conduit to form a cooling passageway. Other means such as cooling air may be used to cool the interface bonding portions.

As noted in the previous application, examination of test samples indicates that the oil remains in the bond area during the bonding process and is found in the bond after completion of thermal bond, as noted in the inventors' copending application. The susceptor particles generally are embedded in the plastic while they are in the soft, hot bonding state.

Figure 7:
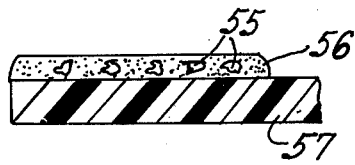
FIG. 7 is a view similar to FIG. 6 and illustrating another embodiment wherein thermoplastic granules are also incorporated in the film.
Figure 8:
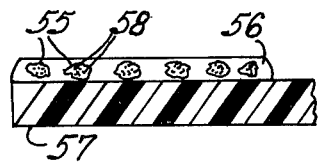
FIG. 8 is also a view similar to FIG. 6 and illustrating another embodiment wherein the susceptor particles are dispersed in thermoplastic granules incorporated in the film.

It may, in certain applications, be desirable to include a thermoplastic particle 55 in the oily film 56 and may, for example, be in addition to the particles dispersed within the bonding agent or stratum, as shown in FIG. 7. Such granulated thermoplastic material may typically be the same as that of layers 57 to be bonded, as, for example, polyethylene, but may be any other compatible bonding plastic material or other conditioning material. If desired the heat generating particles 58 may be dispersed throughout an added plastic granule 55, as shown in FIG. 8. For example, the susceptor particles may be dispersed into an additive plastic which is then pulverized and dispersed in the film 56. The dispersion of particulate susceptor particles 58 in thermoplastic 55 may also be accomplished during extrusion of a thermoplastic prior to pulverization, by a heated milling of the two plastic and particles prior to the reduction of thermoplastic 55 to the desired size or any other suitable means.

The oily film and the particles of the embodiment of FIGS. 5 - 9 may be applied in any suitable manner. The overlapping portion of a layer may be coated with the oily film. Thereafter, the susceptor particles and/or granulated thermoplastic particles may be sprinkled on the film and retained by the adhesive properties of the oily film. In a practical method, the plastic element may be coated with the oily film and immersed in a fluidized bed of susceptor particles and/or plastic granules to apply the susceptor particles and plastic particles. Alternatively, a fluidized bed of the oily film material and the desired particles may be provided and the element dipped therein, for example, where the combination is applied to both surfaces of a carrier as in FIG. 4.

The present invention thus provides a practical and unique method of implementing the thermal bonding of plastic units or elements over a joinder interface portion having an interposed oily film at the interface portion.

Various modes of carrying out the invention are contemplated as being within the scope of the following claims particularly pointing out and distinctly claiming the subject matter which is regarded as the invention.

We claim:

1. A method for the thermal bonding of first and second plastic elements over a joinder interface portion comprising:
   interposing between the joinder interface portions a film of an oleaginous substance;
   juxtapositioning the elements so that the interface portions thereof to be joined are contiguous to form with the interposed film a joinder region including the film and the plastic material of such elements;
   incorporating within the joinder region heat generating particles generating heat in the particles upon exposure to a high frequency energy field;
   exposing the heat source particles to the high frequency energy field to heat the plastic material in the contiguous joinder interface portions to thermal bonding temperature; and
   retaining the joinder interface portions in intimate contact until a thermal bond is formed.

2. The method of claim 1 further defined as including a step of applying pressure over the joinder interface portions with the joinder interface portions at the bonding temperature.

3. The method of claim 2 including the applying of said pressure in the presence of said field.

4. The method of claim 1 including the step of cooling the joinder interface portion to accelerate formation of the bond.

5. The method of claim 1 wherein said interposing step includes providing a material selected from the group consisting of petroleum based oils, the lipids and grease.

6. The method of claim 1 wherein said step of incorporating heat source particles includes employing particles activated by exposure to a high frequency alternating magnetic field and said exposing step includes the creating of a high frequency alternating magnetic field.

7. The method of claim 6 wherein said exposing step is further defined as subjecting the contiguous joinder portions to a magnetic field having a frequency of from 0.4 to 5000 megahertz, and said particles are selected to generate heat as a result of hysteresis losses.

8. The method of claim 7 further defined as subjecting the contiguous joinder portions to a magnetic field having a frequency of from 2 to 30 megahertz.

9. The method of claim 6 further defined as incorporating a particulate susceptor comprising nonconductive ferromagnetic oxides.

10. The method of claim 9 further defined as incorporating particles selected from a class consisting of gamma $Fe_2O_3$ and $Fe_3O_4$, in the plastic material.

11. The method of claim 9 further defined as incorporating susceptor particles selected from a class consisting of gamma $Fe_2O_3$ and $Fe_3O_4$, and said exposing steps include creating a magnetic field having a frequency of from 2 to 30 megahertz.

12. The method of claim 1 further defined as incorporating susceptor particles heatable upon exposure to radiant energy and wherein said exposing step includes forming of a radiant energy field.

13. The method of claim 1 wherein the incorporating step is further defined as dispersing a particulate susceptor heatable upon exposure to an energy field in at least the contiguous joinder portion of at least one of the first and second materials.

14. The method of claim 13 further defined as dispersing a nonconductive ferromagnetic oxide particulate susceptor in the thermoplastic material forming the joinder portion.

15. The method of claim 13 further defined as dispersing a nonconductive ferromagnetic oxide susceptor particle having a particle size between 0.01 microns and 25 microns.

16. The method of claim 1 including the further step of dispersing plastic granules in the oleaginous film and selected of a plastic resulting in thermal bonding to said elements in the presence of said field.

17. The method of claim 16 further defined as dispersing susceptor particles into the plastic granules.

18. A method for the thermal bonding of first and second thermoplastic elements over an interface joinder portion comprising: forming a mixture of an oleaginous substance and solid plastic particles bondably compatible with said elements, interposing a film of said mixture at the interface joinder portion, incorporating in the interface joinder portion dispersed susceptor particles heatable upon exposure to a high frequency energy field; and exposing the susceptor particles to the energy field to heat the interface joinder portion including said film and plastic particles to bonding temperature to form an integral thermal bond between the elements and the plastic particles.

19. The method of claim 18 including the further step of mixing said susceptor particles into said mixture of oleaginous material and solid plastic particles.

20. The method of claim 18 including the step of embedding said susceptor particles into said plastic particles and then forming said mixture.

21. The method of claim 20 wherein said susceptor particles are of a size within the range of 0.01 to 25 microns.

* * * * *